Patented Feb. 14, 1939

2,147,202

UNITED STATES PATENT OFFICE 2,147,202

OPAQUE VITREOUS ENAMEL AND PROCESS OF MAKING SAME

Ignaz Kreidl, Vienna, Austria, assignor to the firm of Vereinigte Chemische Fabriken Kreidl, Heller & Co. Mfg., Vienna, Germany No Drawing. Application November 25, 1931, Serial No. 577,402. Renewed December 5, 1936. In Austria December 10, 1930

8 Claims. (Cl. 106—36.2)

The present application is a continuation in part of my copending application Serial Number 577,164, filed November 24, 1931.

The present invention relates to the production of white, opaque enamels and glazes, especially sheet-iron enamels, by means of gas bubbles, that is to say by the employment of decomposable substances, which, on burning the enamel, liberate gas, which being distributed throughout the enamel mass, effects opacity thereof. The invention is based on the observation that the opaquing power of the opacifying agents increases with the fineness and uniformity of distribution of the opacifying agent—that is a substance upon being heated to high temperatures used in enamelling, will liberate the gas bubbles—in the enamel slip. The object of the invention is to obtain that uniform distribution of said agent, or the gas bubbles in the enamel slip that will produce the most effective opacity of the enamel. According to the invention, this is accomplished by the employment of substances producing opacity by the evolution of gas in association with enamel frits which assume the colloidal condition in the slip, or at least are in a state of fine division approximating to that condition.

The colloidal condition of the frit in the enamel slip has the effect of rendering the entire frit effective for the distribution, or fixation by adsorption of the opacifying agent comprising the gas bubbles. According to the invention, therefore, the entire frit, as such is effective as regards the distribution of the opacifying agent. This is important for the reason that substances capable of absorbing the gas clouding agent, as for example clay, can be added only in very restricted amounts in order not to impair the elasticity, plasticity and gloss of the enamel, and said small amounts of the adsorptive media can never give rise to such fine distribution as when the entire frit is rendered effective for that purpose.

The fine distribution or fixation by adsorption of the gas clouding agent in the enamel slip, attained by rendering the frit available for the distribution and adsorption of said agent also affords, on the one hand, a means for increasing the number of the gas bubbles and, on the other hand, a means for evolving only gas bubbles of so small a size, that even a subsequent increase in their size, brought about by an over-firing of the enamel, does not impair the opacity of the enamel.

Moreover the present invention prevents the gas bubbles which may be liberated during the decomposition of the opacifying agent on burning the enamel, from becoming too large. Gas bubbles of excessive size, which, per se produce an opacity that is inferior to that furnished by smaller bubbles, also tend, at the higher firing temperatures and longer firing periods unavoidable in practice, to increase by coalescence and thus lessen the opacity and also cause pitting of the surface of the enamel by bursting through it.

An enamel slip which according to this invention is in a colloidal state and therefore is directly in a plastic condition also enables the addition of plasticizing agents, such as clay, or the like, on the mill, to be reduced if desired or entirely dispensed with.

Accordingly, the invention also affords a means for reducing—and, if desired, dispensing with— the addition of adsorptive media and plasticizing agents on the mill. This omission of clay and other plasticizing agents of itself, has the advantage of retaining the elasticity and gloss of the enamel and of reducing, or entirely preventing, the same from being or becoming brittle.

The invention is further based on the observation that the use of frits which become colloidal in the slip, also affords a means to intensify the clouding effect in such processes for white clouding of enamels in which as clouding agents, either compounds or complexes containing volatile constituents and solid white clouding agents (such as tin oxide, zirconium oxide or the like) are used or mixtures of such solid white clouding agents with substances which act as clouding agents by the developing of gas bubbles. Thus, such frits afford a means to intensify the clouding effect of such compounds, complexes or mixtures by which a gas clouding may be effected in such a manner that the amount of the solid clouding agent in the opaque white enamel is so small that it could not, of itself, produce a sufficient clouding effect.

Such gas producing compounds or complexes can be prepared by known processes and examples of same are the compounds of zirconium, tin and antimony with organic acids and bases.

The modification of the enamel frit in such a way that it is in a colloidal state in the slip, or in a state of fine distribution approximating thereto, can be brought about by mechanical, chemical or colloid-chemical means—such as, in the case of mechanical means, by grinding in colloid mills—but preferably by modifying the chemical composition of the frit. If desired, such measures may be employed conjointly.

The condition corresponding to the invention is recognizable externally by the fact that the ground frit does not settle out even when no plasticizing agent, such as clay, is added.

A frit that becomes colloidal in the enamel slip can be obtained by chemical means, such as increasing the addition of substances containing fluorine to the enamel batch, i. e. the unfused crude mixture. Enamel batches containing double the ordinary amount (about 5%) of fluorine, namely, for example 10% and even more, are suitable for the process according to the invention. The increase in the fluorine content, however, must be obtained by adding fluorine containing compounds other than cryolite, that is to say, the amount of fluorine in excess of 5% is supplied by the non-cryolitic fluorine compounds.

Among fluorine-bearing substances, the addition of alkali silico-fluorides, such as sodium silico-fluoride, alone or in association with clay, feldspar or the like, has been found particularly suitable. Another method of rendering the frit colloidal in the slip is attained by adjusting the composition of the raw frit mix so that the alkali content ($Na_2O$ or $K_2O$) is such that the ratio of alkali to boric acid is greater than 1½ parts by weight of alkali to 1 part by weight boric acid, with the condition imposed that the alkali content of any fluorine compound present in the enamel frit mix is not considered in adjusting the said ratio of alkali to boric acid, or in other words, the alkali content of fluorine compounds provides that amount of alkali in excess of the said 1½ to 1 ratio of alkali to boric acid.

The use of frits which become colloidal—especially as a result of modifying their chemical composition—has the advantage that the enamel is not liable to crack upon firing, and is also less sensitive to overfiring, than are the ordinary enamel masses.

The use of frits that are in a colloidal condition in the slip is also attended with the advantage of facilitating the application of the enamel slip on the wares to be enamelled.

In carrying out the process, the enamel frit is ground on the mill in the usual manner, with addition of the opacifying agent, and other adjuncts if desired, and is used in the ordinary way.

The addition of clay on the mill may be postponed to a later stage of grinding, and even to the time when the frit is already colloidal, thus affording the advantage that the clay is not ground too long and unduly fine.

*Example I*

The following enamel mixture is fritted:

|  | Grams |
|---|---|
| Borax _____about__ | 24.6 |
| Sodium carbonate_____do____ | 3.2 |
| Potassium nitrate_____do____ | 4.2 |
| Calc spar_____do____ | 1.6 |
| Sodium silico-fluoride_____do____ | 20.0 |
| Feldspar_____do____ | 24.6 |
| Kaolin_____do____ | 2.1 |
| Quartz_____do____ | 25.7 |

The melting process should, however, not be carried out for too long a period of time, or performed at unduly high temperature, since both these factors may impair the result in view, probably through lowering the fluorine content, by volatilization thereof.

1000 grams of this frit are ground in the ordinary way, with 500 grams of water and for example with 1.5 grams of methylene blue as gas-producing opacifying agent, for about 8 hours, and then applied on the wares to be enamelled and fired as usual.

*Example II*

1000 grams of the frit described in Example I are ground with 0.34 gram of methylene blue and 60 grams of clay, for about 8 hours in the ordinary way, and then applied to the wares to be enamelled and fired as usual.

As gas producing opacifying agent methylene blue may be replaced by any other substance that is decomposable at the usual enamel firing temperature.

*Example III*

Example of a frit which is brought into a colloidal state in the slip by increasing the ratio of alkali to boric acid to an amount surpassing 2:1.

|  | Grams |
|---|---|
| Borax _____approximately__ | 15.0 |
| Feldspar_____do____ | 34.0 |
| Quartz_____do____ | 20.0 |
| Sodium fluosilicate_____do____ | 12.0 |
| Fluospar_____do____ | 2.1 |
| Sodium carbonate_____do____ | 20.8 |
| Potassium nitrate_____do____ | 3.0 |
| Kaolin_____do____ | 6.2 |

In this example the larger amount of alkali is introduced in the mixture in the form of sodium carbonate.

What I claim is:

1. In a process for producing a vitreous enamel for iron ware and the like, comprising preparing a composition of matter containing siliceous materials, borates and fluorine compounds, the amount of fluorine contained therein being at least ten per cent of the unfused raw mixture by weight, any amount of such fluorine present in excess of 5% being supplied by a fluorine compound other than cryolite, and adding to the frit during the grinding thereof to form a slip, a substance adapted to evolve gas during the firing of the enamel, which gas remains in the enamel in the form of bubbles, thus effecting the clouding of the said enamel.

2. The process as set forth in claim 1, in which the fluorine is supplied by an alkali metal fluosilicate.

3. In a process of producing a vitreous enamel comprising preparing a composition of matter containing siliceous materials, borates and fluorides, the amount of the latter being introduced into the unfused raw mixture by means of a fluosilicate such as to furnish 10% to 12% of fluorine based on the total weight of the said unfused raw mixture, and adding to the said frit during the grinding thereof to form a slip, a substance adapted to evolve gas during the firing of the enamel, which gas remains in the enamel in the form of bubbles, thus effecting the clouding of the said enamel.

4. The process of producing clouded vitreous enamels for iron ware, which comprises providing an enamel frit composed essentially of borates, siliceous materials, and fluorine compounds besides the other usual constituents, the amount of fluorine being at least about 5% of the total weight of the unfused raw mixture, any increase in flourine content above about 5% being supplied by fluorine compounds other than cryolite, and the ratio of alkali expressed as $Na_2O$ or $K_2O$ to boric acid being substantially greater than one and one-half parts of alkali to one part of boric acid, excluding the alkali content of any fluorine compound and adding to said frit during the formation of the slip a substance adapted to evolve gas during the customary burning of the enamel, which gas remains in the enamel in the form of bubbles, thus effecting the clouding of the said enamel.

5. The process of producing white clouded vitreous enamels for iron ware, which consists in providing an enamel frit composed essentially of borates, siliceous materials, and fluorine compounds besides the other usual constituents, the amount of fluorine contained therein being at least 10 to 12% of the total weight of the frit, at least half of which fluorine is supplied by a fluorine compound other than cryolite, and the ratio of alkali expressed at $Na_2O$ or $K_2O$ to boric acid being greater than one and one-half parts of alkali to one part of boric acid, excluding the alkali content of any fluorine compound, and adding to said frit during the formation of the slip a substance adapted to evolve gas during the customary burning of the enamel, which gas remains in the enamel in the form of bubbles, thus effecting the clouding of the said enamel.

6. A vitreous enamel slip which comprises a frit resulting from melting together a mixture of ingredients containing siliceous material, borates and fluorine compounds, the total fluorine in such mixture being between about 10% and about 12%, and of which total fluorine present, all of the part in excess of 5% is in the form of fluorine compounds other than cryolite; such resulting frit being ground with clay and water; and such slip having incorporated therein a substance that is adapted to evolve a gas during subsequent firing of the enamel, which gas will remain in the enamel in the form of fine bubbles to effect the clouding of the enamel.

7. A vitreous enamel slip containing a ground frit, clay, water and a gas clouding agent, said frit being one resulting from melting together a mixture of ingredients containing siliceous material, borate and fluorine compounds, the amount of total fluorine in said mixture being between about 10% and about 12%, and all that portion of the said fluorine which is in excess of 5% being in the form of fluorine compounds other than cryolite, and the ratio of alkali present, other than alkali in the form of fluorine compounds, calculated as alkali metal oxide, to boric acid in said mixture being greater than 1.5:1; said frit, clay and water being ground together; and said gas clouding agent being incorporated into said slip and being a substance adapted to evolve gas on being heated to the high temperatures used in the firing of the enamel, and such gas remaining in said enamel to constitute an opacifying agent for said enamel.

8. A vitreous enamel slip comprising a frit resulting from the melting and grinding of a mixture of ingredients containing siliceous materials, borates, and fluorine compounds, the amount of fluorine in such mixture being at least 5%, any increase in fluorine content above about 5% being supplied by fluorine compounds other than cryolite, the ratio of alkali expressed as $Na_2O$ or $K_2O$ to boric acid being greater than one and one-half parts of alkali to one part of boric acid, excluding the alkali content of any fluorine compound, clay, water, and a substance which is adapted to evolve gas during the firing of the enamel, which gas remains in the enamel in the form of bubbles, thus effecting the clouding of the enamel.

IGNAZ KREIDL.